US012611734B2

(12) United States Patent
O'Connor et al.

(10) Patent No.: US 12,611,734 B2
(45) Date of Patent: Apr. 28, 2026

(54) METHOD OF AND APPARATUS FOR CUTTING A SUBSTRATE OR PREPARING A SUBSTRATE FOR CLEAVING

(71) Applicant: University of Galway, Galway (IE)

(72) Inventors: Gerard O'Connor, Galway (IE); Nazar Farid, Galway (IE); Adam Collins, Galway (IE); Cormac O'Brien, Galway (IE)

(73) Assignee: UNIVERSITY OF GALWAY, Galway (IE)

( * ) Notice: Subject to any disclaimer, the term of this patent is extended or adjusted under 35 U.S.C. 154(b) by 106 days.

(21) Appl. No.: 18/696,767

(22) PCT Filed: Sep. 29, 2022

(86) PCT No.: PCT/EP2022/077195
§ 371 (c)(1),
(2) Date: Mar. 28, 2024

(87) PCT Pub. No.: WO2023/052549
PCT Pub. Date: Apr. 6, 2023

(65) Prior Publication Data
US 2024/0335909 A1     Oct. 10, 2024

(30) Foreign Application Priority Data

Oct. 1, 2021     (EP) ..................................... 21200595

(51) Int. Cl.
*B23K 26/364*     (2014.01)
*B23K 26/0622*     (2014.01)
(Continued)

(52) U.S. Cl.
CPC ........ *B23K 26/364* (2015.10); *B23K 26/0624* (2015.10); *B23K 26/0652* (2013.01);
(Continued)

(58) Field of Classification Search
CPC ............. B23K 26/364; B23K 26/0624; B23K 26/082; B23K 26/0652; B23K 26/38;
(Continued)

(56) References Cited

U.S. PATENT DOCUMENTS 8,980,726 B2     3/2015  Lei et al.
10,615,044 B1    4/2020  Vázquez-Córdova
(Continued)

FOREIGN PATENT DOCUMENTS

EP          3490011 A1     5/2019
JP      2006248885 A  *  9/2006  ........... B23K 26/361
(Continued)

OTHER PUBLICATIONS

Takeji Translation (Year: 2006).*
(Continued)

*Primary Examiner* — JaMel M Nelson
*Assistant Examiner* — Erica Hartsell Funk
(74) *Attorney, Agent, or Firm* — CANTOR COLBURN LLP

(57)          ABSTRACT

The present application relates to a method (100) for use in cutting a substrate or preparing a substrate for cleaving. The method (100) comprises: irradiating (102) the substrate with a plurality of pulses of a laser beam, the pulses having a pulse duration of less than a nanosecond and an elongate cross sectional spatial profile, and wherein the fluence of the plurality of pulses is controlled to be less than a single shot damage threshold fluence of the substrate; providing (104) relative movement between the laser beam and the substrate such that the plurality of pulses are arranged along a cutting path; and controlling (106) the relative movement such that each of the pulses is spatially overlapped with at least one
(Continued)

other of the pulses along the cutting path. An apparatus having a laser system configured to perform the method (100) is also disclosed.

20 Claims, 6 Drawing Sheets

(51) Int. Cl.

| | |
|---|---|
| *B23K 26/064* | (2014.01) |
| *B23K 26/082* | (2014.01) |
| *B23K 26/38* | (2014.01) |
| *B23K 26/402* | (2014.01) |
| *C03B 33/02* | (2006.01) |
| *C03C 23/00* | (2006.01) |
| *B23K 103/00* | (2006.01) |

(52) U.S. Cl.
CPC ............ *B23K 26/082* (2015.10); *B23K 26/38* (2013.01); *B23K 26/402* (2013.01); *C03B 33/0222* (2013.01); *C03C 23/0025* (2013.01); *B23K 2103/52* (2018.08); *B23K 2103/54* (2018.08)

(58) Field of Classification Search
CPC .............. B23K 26/402; B23K 2103/52; B23K 2103/54; C03B 33/0222; C03C 23/0025
See application file for complete search history.

(56) References Cited

U.S. PATENT DOCUMENTS

| | | | |
|---|---|---|---|
| 10,710,922 | B2 | 7/2020 | O'Connor et al. |
| 2005/0029239 | A1 | 2/2005 | Matsumoto et al. |
| 2015/0096329 | A1 | 4/2015 | Li et al. |
| 2015/0140735 | A1 | 5/2015 | Hosseini |
| 2018/0111869 | A1* | 4/2018 | O'Connor ......... B23K 26/0624 |
| 2021/0053160 | A1 | 2/2021 | Qiao et al. |

FOREIGN PATENT DOCUMENTS

| | | |
|---|---|---|
| SG | 10201909358 U | 5/2020 |
| TW | 201430935 A | 8/2014 |
| WO | 2005037482 A1 | 4/2005 |
| WO | 2012006736 A2 | 1/2012 |
| WO | 2020130165 A1 | 6/2020 |

OTHER PUBLICATIONS

Collins, Adam R., "Ultrashort pulse laser scribing of thin flexible glass", National Centre for Laser Applications, School of Physics, National University of Ireland, Galway, Oct. 2015, 236 pages.

Collins, Adam, R., and Gerard M. O'Connor, "Mechanically inspired laser scribing of thin flexible glass," Optics Letters, vol. 40, No. 20,, Oct. 15, 2015, 4 pages.

Collins, Adam, R., et al., "Mechanically inspired laser scribing of thin brittle materials" J Am Ceram Soc. 2017; 100: 5318-5326.

Liu, J. M., "Simple technique for measurements of pulsed Gaussian-beam spot sizes", Opt. Lett., (19820000), vol. 7, No. 5, pp. 196-198.

International Search Report for International Application No. PCT/EP2022/077195; Date of Search Mar. 15, 2023, 5 pages.

Written Opinion for International Application No. PCT/EP2022/077195; Date of Search Mar. 15, 2023, 5 pages.

* cited by examiner

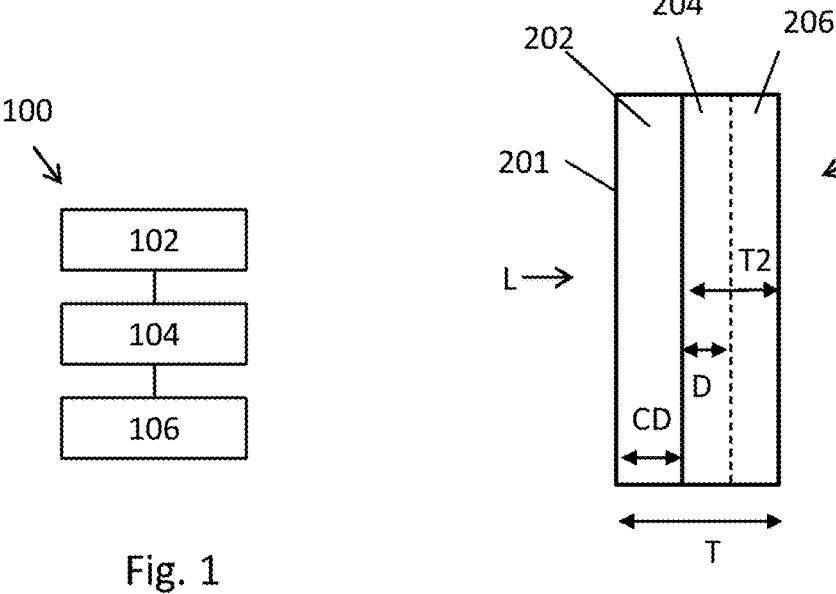
Fig. 1
Fig. 2
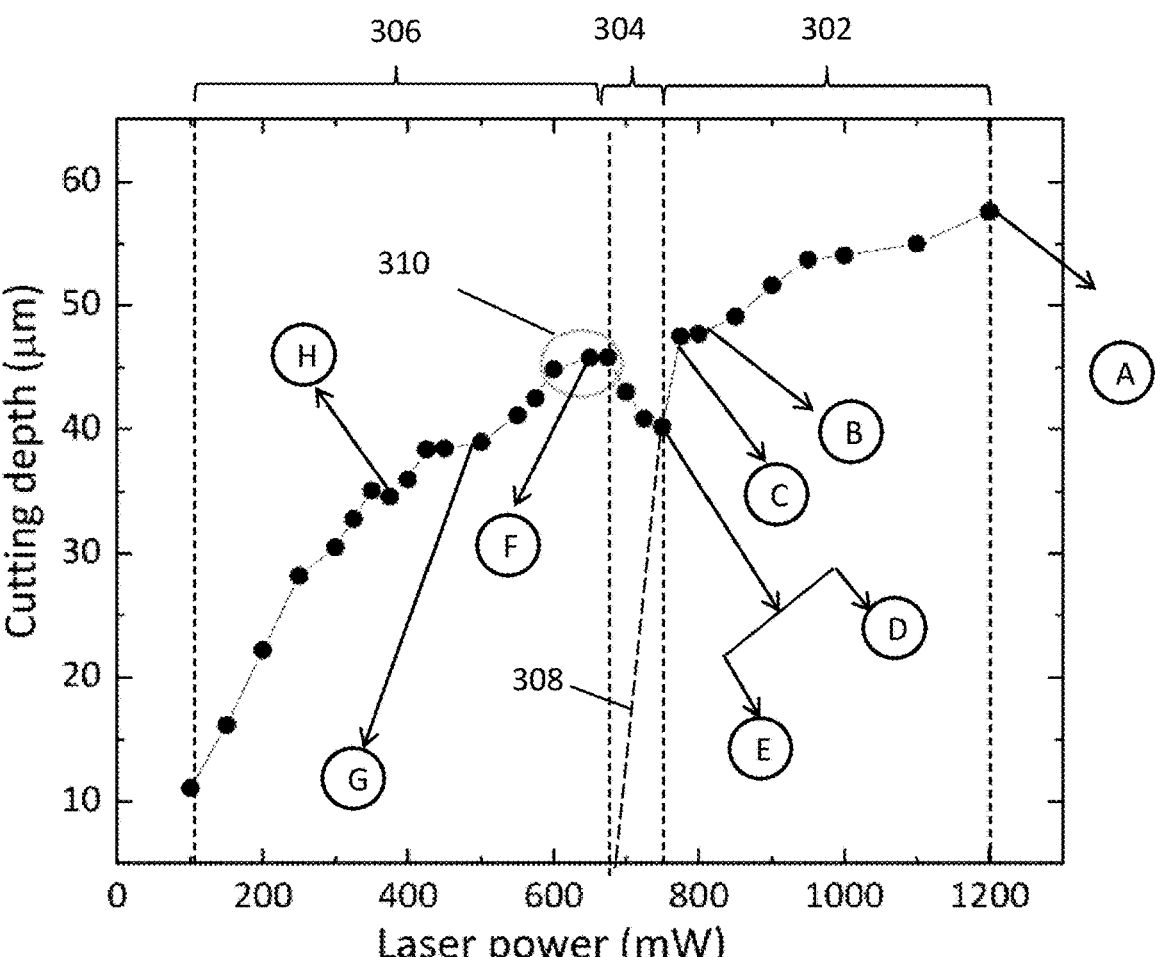
Fig. 3a

METHOD OF AND APPARATUS FOR CUTTING A SUBSTRATE OR PREPARING A SUBSTRATE FOR CLEAVING

CROSS REFERENCE TO RELATED APPLICATIONS

This application is a National Stage application of PCT/EP2022/077195, filed Sep. 29, 2022, which claims the benefit of European Application No. 21200595.3, filed Oct. 1, 2021, both of which are incorporated by reference in their entirety herein.

TECHNICAL FIELD

The present application relates to a method and an apparatus for use in cutting a substrate or preparing a substrate for cleaving. The method may form part of a method of cutting the substrate, and the apparatus may similarly form part of a laser cutting apparatus. The substrate may be a brittle material, such as glass or ceramic. Brittle materials may include those that are inherently brittle, or those that are rendered into a brittle state by another process (e.g. application of low temperature or stress). The substrate may be a thin material, for example having a thickness of less than 200 microns.

BACKGROUND

The cutting of thin substrates such as glass or ceramics is important in a number of fields, including for use in touch screen displays and photovoltaic applications. Known techniques for cutting thin glass for these applications includes the use of $CO_2$ laser cutting, ablative/erosion techniques and scribe and break techniques. These techniques however generally suffer from low processing speeds and reduced edge quality.

Laser ablation is the ejection of matter from a surface following exposure to a beam of laser energy. In order for laser ablation to occur, the laser energy applied to the material must exceed an energy threshold. This threshold energy per unit area is known as the threshold fluence, and is measured in units of $Jcm^{-2}$.

The laser energy is distributed in a cross-sectional spatial profile. Typically this profile is Gaussian, and is therefore most intense in the centre and least intense at the edges of the beam. While the applied fluence at the centre of the laser beam may exceed the ablation threshold, the material exposed to the fluence at the edge of the beam is typically less than the threshold fluence. Moreover, as the laser beam is absorbed as it propagates into the material, there is a depth below the surface of the material where the attenuated laser fluence is also no longer sufficient to eject matter from the surface. Thus the energy at the beam edges and at depths below the surface where the ablation does not occur has the potential to cause unwanted damage in the material. This damage can include the presence of micro-cracks, residual stress due to other defects, different re-solidified phases and surface chemistries. The greater the ablation threshold fluence, the greater the impact this damage has on the material and the effectiveness of laser cutting, drilling and scribing processes.

In order to reduce the scale of this damage, processes are routinely developed using a laser fluence which is close to the ablation threshold fluence, specifically using process parameters that slightly exceed the threshold fluence by a small margin, thus maintaining the excess energy and associated damage to a minimum.

Even when processes just above the ablation threshold are used, some materials are damaged significantly. This damage can be observed as increased brittleness in thin dielectric materials, as an increase in the heat affected zone in metallic or polymeric materials, as phase changes in ceramics, or as regions of different doping profiles in semiconductors. All these effects result in reduced performance.

WO2012006736 (A2) discloses a method for the internal processing of a transparent substrate in preparation for a cleaving step. The substrate is irradiated with a focused laser beam that is comprised of pulses having an energy and pulse duration selected to produce a filament within the substrate. The substrate is translated relative to the laser beam to irradiate the substrate and produce an additional filament at one or more additional locations. The resulting filaments form an array defining an internally scribed path for cleaving the substrate. One aim of this filament technique is to locate the beam focus to generate the filaments within the substrate such that at least one surface of the substrate can be substantially free from ablation. The drawbacks of this technique are however that it is only suitable for use with transparent materials in order to produce filaments within the material. The filament technique is also less effective for thinner substrates, and requires complex high performance optics.

It is an object of the present application to provide improved methods and apparatuses for cutting a substrate or preparing it for cleaving using laser ablation. More specifically, to provide methods and apparatuses that are suitable for the efficient cutting of thin substrates (e.g. including glass and ceramics) with a high degree of cut edge quality and/or which reduce particulates created during processing and/or which are suitable for scalable manufacturing platforms.

SUMMARY

In a first aspect, the present application provides a method for use in cutting a substrate or preparing a substrate for cleaving, comprising any one or more of the following steps:

irradiating the substrate with a plurality of pulses of a laser beam, the pulses having a pulse duration of less than a nanosecond and an elongate cross sectional spatial profile, and wherein the fluence of the plurality of pulses is preferably controlled to be less than a single shot damage threshold fluence of the substrate;

providing relative movement between the laser beam and the substrate such that the plurality of pulses are arranged along a cutting path; and controlling the relative movement such that each of the pulses is spatially overlapped with at least one other of the pulses along the cutting path.

By using an elongate beam shape and spatially overlapped pulses, with ultrashort sub-nanosecond pulse duration, the inventors have found a new reduced fluence laser ablation technique. When the fluence of the laser pulses is controlled to be less than the single shot damage threshold fluence of the substrate, the present method allows the material to ablate with significantly reduced damage. The new lower energy ablation regime accessed by the methods of the present application is an unexpected result, given known processing techniques. The process of the present application enables precision structuring of substrates such as glass and ceramic materials, without significant thermally induced micro-cracking. The inventors have found that by operating at a reduced fluence the thermal energy applied to the material is limited, which in turn reduces the thermal stress generated in the material on cooling. Improved processing of the material is therefore provided for either cutting or preparing the substrate for cleaving.

The fluence of the plurality of pulses may be controlled such that it is below the corresponding single shot damage threshold for the laser pulses being used and the specific substrate being cut. By "corresponding single shot damage threshold" we therefore mean the damage threshold that would be found for a single laser pulse of the same pulse duration wavelength and substrate for which the method is performed.

The plurality of pulses may each have a fluence less than 70% of the single shot damage threshold fluence of the substrate. This has been found to provide advantageous cut edge quality. More preferably, the plurality of pulses may each have a fluence less than 50% of the single shot damage threshold fluence of the substrate, and even more preferably less than 30%.

The fluence of the plurality of pulses may be controlled to produce seeded micro-cracks extending a depth at most only part way through a thickness of the substrate. Preferably the fluence may be controlled to minimise the depth at which the seeded micro-cracks terminate. By reducing the seeding of micro-cracks a low fluence regime is used in which laser energy may instead contribute to removal of material. This may produce an improved quality of cut edge.

A cutting depth caused by the laser irradiance may be dependent on the fluence of the plurality of pulses of the laser beam. The dependence between the fluence and cutting depth may have one fluence range (e.g. a first range) in which the cutting depth decreases with decreasing fluence.

The dependence between the fluence and cutting depth may have a fluence range (e.g. a second range) in which the cutting depth increases with decreasing fluence. The second fluence range may be at lower fluences to that of first fluence range. The fluence of the plurality of pulses may be controlled to be within or less than the second fluence range.

The dependence between the fluence and cutting depth may have a fluence range (e.g. a third range) in which the cutting depth decreases with decreasing fluence. The third fluence range may be at lower fluences to that of the second (and first) fluence range. The fluence of the plurality of pulses may be controlled to be within the third fluence range.

By controlling the fluence such that it is in or below the second fluence range, or more preferably within the third fluence range, an improved quality of cut may be provided. In some embodiments, the fluence may be controlled so that it is equal to just less than the fluence of the upper boundary of the third fluence range. This may provide further improved edge quality.

The elongate cross sectional spatial profile may be elliptical in shape. This may require simpler optics to produce. Other elongate shapes may be used.

The elongate shape of each of the plurality of pulses may have a major and a perpendicular minor axis, the length of the major axis across the elongate shape being greater than the minor axis. The plurality of pulses may be oriented with respect to the substrate such that the major axis of the elongate cross section of each pulse is aligned with the length of the cutting path in the direction of relative movement between the laser beam and substrate. In other words, the longest length of the elongate shape of the pulses is aligned with the cutting path, or scanning direction, on which the laser pulses are incident. This may help to increase the overlap between pulses.

The cutting path may comprise a curved (i.e. non-straight) portion. The orientation of the plurality of pulses may be varied as a function of position along the cutting path within the curved portion. This may be to maintain alignment of the major axis of the elongate cross sectional spatial profile with the cutting path. This may help to produce a curved cutting path with a small radius of curvature and complex cut shapes.

The smallest rectangular bounding box containing the elongate cross sectional spatial profile of each of the plurality of laser pulses may have an aspect ratio greater than 2, and preferably greater than 3, and further preferably in a range between 2 and 4.

There may be a high degree of overlap between pulses. The percentage degree of overlap (parameter "O" as defined elsewhere herein) may be equal to 90%. More preferably the overlap may be greater than 95%, and preferably greater than 98%. This may allow each point along the cutting path to be exposed to a larger number of laser pulses. The percentage degree of overlap may be defined by the distance between corresponding points on adjacent laser pulses as a proportion of the spatial length of each laser pulse along the cutting path.

Providing the relative movement between the laser beam and the substrate may comprise moving the laser beam along the cutting path only once in order to cut the substrate or prepare it for cleaving. This may improve the cut edge quality, as alignment between multiple passes is not required. This may be particularly suitable for thinner materials. Multiple passes may however be used in some embodiments.

A second aspect provides a method of cutting a substrate, comprising the method of the first aspect (or as described or claimed anywhere herein).

The substrate may be partially cut by irradiation by the laser along the cutting path. The method of cutting may further comprise applying stress to the substrate to cleave or singulate the substrate along the cutting path. This may allow the substrate to be split into different parts at a later time.

The stress may be applied by the laser irradiation (e.g. by the same laser used for cutting).

The stress may be applied mechanically. The stress may be applied by bending the substrate. The stress may be applied by driving a rigid member against a localised region of the substrate.

The stress may be applied by generating a mechanical resonance in the substrate.

The stress may be applied thermally.

The stress may be applied by causing a phase change within the substrate.

The stress may be applied by any one or more of the above.

The substrate may be completely cut (e.g. completely through its thickness) by the laser irradiation. In this case, no separate cleaving is required.

A third aspect provides an apparatus suitable for use in cutting a substrate or preparing the substrate for cleaving, comprising:

a laser system configured to:

irradiate the substrate with a plurality of pulses of a laser beam, the pulses having a pulse duration of less than a nanosecond and an elongate cross sectional spatial profile, and wherein the fluence of the plurality of pulses is preferably controlled to be less than a single shot damage threshold fluence of the substrate;

provide relative movement between the laser beam and the substrate such that the plurality of pulses are arranged along a cutting path:

control the relative movement such that each of the pluses is spatially overlapped with at least one other of the pulses along the cutting path.

The apparatus of the third aspect may be configured to perform the method of the first aspect (or any method described or claimed anywhere herein).

The laser system may comprise a beam rotation device arranged to rotate the laser beam pulses. The beam rotation device may comprise a dove prism. The dove prism may be mounted on a rotatable mount, and may be rotatable about an axis long the beam laser beam path. The dove prism may be further arranged to shape the beam into an elliptic beam shape.

A fourth aspect provides a laser cutting apparatus comprising the apparatus of the third aspect.

The laser system may be arranged to partially cut the thickness of the substrate, and the laser cutting apparatus may be further arranged to apply a stress to the substrate to cleave the substrate along the cutting path.

The laser system may be arranged to completely cut the thickness of the substrate along the cutting path.

The skilled person will appreciate that except where mutually exclusive, a feature described in relation to any one of the above aspects may be applied to any other aspect.

BRIEF DESCRIPTION OF THE DRAWINGS

Embodiments of the invention will now be described, by way of example only, with reference to the accompanying drawings:

FIG. 1 shows a method for cutting a substrate or preparing it for cleaving/singulation according to an embodiment:

FIG. 2 shows the cut edge of a substrate after processing by the method shown in FIG. 1.

FIG. 3*a* shows a plot of the cutting depth of the laser pulses used in the method of FIG. 1 as a function of the laser power;

DETAILED DESCRIPTION

Figure 3B:
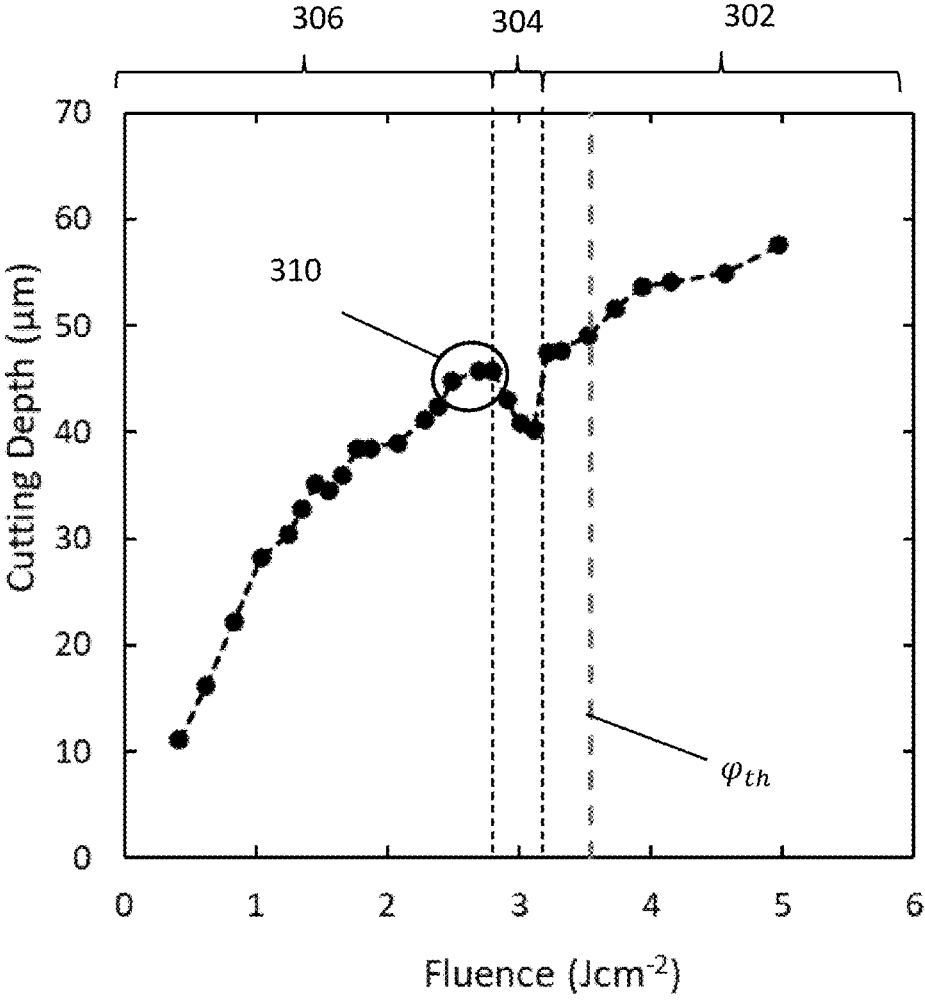
FIG. 3*b* shows a plot of the cutting depth of the laser pulses used in the method of FIG. 1 as a function of the laser fluence corresponding to FIG. 3*a;*

FIGS. 1 and 2 illustrate a method 100 according to an embodiment of the present application. The method involves processing a substrate 200. The method is suitable for use in cutting the substrate 200, or preparing the substrate 200 for cleaving or singulation into separate parts (e.g. by scribing it). FIG. 2 shows a cross section through the substrate 200 after it has been cut to show the cut edge formed. The method may be used to fully cut the thickness of the substrate so that it is separated into individual parts, or it may be used to partially cut the thickness of the substrate such that it is prepared for singulation/cleaving to complete the cut.

The method 200 generally comprises processing the substrate 200 using a laser beam directed onto its surface. The substrate 200 is preferably brittle and may, for example, be glass or ceramic. Where the substrate is not already brittle it may be (temporarily or permanently) rendered brittle. This may be done by cooling or via the application of stress. In some embodiments, the substrate may not be brittle when irradiated by the laser beam, but may be rendered brittle so that it can be split into separate pieces in a later cleaving step. The method may be suitable for cutting a thin substrate, e.g. having a thickness (T) of less than 200 microns, or preferably less than 100 microns. Other substrate materials and thicknesses may however be used.

The method 100 comprises irradiating 102 the substrate 200 with a plurality of pulses of a laser beam. The pulses are ultrashort laser pulses of the order of a picosecond or less (i.e. have a duration less than a nanosecond). In some embodiments, shorter duration pulses may be used, such pulses less than a picosecond (e.g. of the order of a femtosecond or less). The laser pulses have an elongate beam profile. That is they have a cross sectional spatial profile in the plane of the substrate which is elongate. In some embodiments the beam shape is preferably elliptical, as will be described later.

The method 100 further comprises providing 104 relative movement between the laser beam and the substrate 200. This causes the plurality of pulses to be arranged along a cutting path extending over the surface of the substrate. The cutting path defines a cutting line along which the substrate is cut, or along which it will be cleaved into separate, into separate pieces. The relative movement may be provided using a galvanometer stage or similar to scan the laser beam across the surface of the substrate 200, which is held stationary. In other embodiments, the substrate may be moved while the laser beam is fixed, or a combination of the both methods used.

The relative movement is controlled 106 such that the pulses from the laser beam are spatially overlapped along the cutting path. Specifically, each of the pluses is spatially overlapped with at least one other of the pulses along the cutting path. The method 100 therefore applies successive elongate (e.g. elliptical) pulses to the surface in a way that each point on the cut path is exposed to multiple pulses as the laser beam is scanned over the surface. The degree of overlap may vary in different embodiments as will be described later. The laser pulses are aligned relative to the substrate such that the longest axis of their elongate shape is aligned with the cutting path. This, along with the use of elongate pulses, allows a greater degree of spatial overlap between the pulses to be achieved.

The laser fluence of the plurality of pulses with which the substrate is irradiated is controlled so that it is less than the single shot damage threshold fluence of the substrate. The fluence of the plurality of pulses is controlled such that it is below the corresponding single shot damage threshold for the laser pulses being used and the specific substrate being cut. By "corresponding single shot damage threshold" we therefore mean the damage threshold that would be found for a single laser pulse of the same pulse duration and wavelength with which the substrate is irradiated in step 102 above, applied to the same substrate that is being processed by the method 100.

Laser ablation threshold is the minimum energy required to cause removal of material. This removal may be ablative, where enough energy is put into the material by the laser to cause the material to disassociate, or thermal, where the material is essentially melted and vaporized, or a combination of the two. The damage threshold is related to, but is different from the ablation threshold. The damage threshold is the minimum laser energy required to cause an undesirable change in the appearance of the material. The damage threshold for a substrate is generally lower and sometimes much lower than the ablation threshold. The single shot damage threshold is defined in the present application as the threshold value of fluence with which the substrate is irradiated at which permanent damage on the substrate can be observed. The fluence can be controlled by appropriate control of the laser power according to known methods.

The damage threshold may be determined using the following relationship:

$$D^2 = 2\omega_0^2 \ln(\varphi_0/\varphi_{th}),\qquad(A)$$

where, $\varphi_0=2E_p/\pi\omega_0^2$, and $\varphi_{th}$ are the applied fluence and damage threshold fluence respectively, $\omega_0$ is the beam waist radius of the Gaussian shaped beam at the focus, $E_p$ is the laser energy, and D is the measured diameter of a crater formed on the substrate surface. In order to determine the damage threshold a series of craters are ablated on a flat sample of the substrate by a focused laser beam (having the corresponding wavelength and pulse duration) with varying levels of pulse energy (i.e. varying applied fluence). The diameter of each crater is measured using an optical microscope. By plotting the square of the crater diameter against the natural log of the applied fluence the damage threshold fluence is determined by extrapolating the data (e.g. using a straight line of best fit) to find the applied fluence where D=0. This may be done by taking the exponential of the negative of the intercept divided by the slope of the best fit line. The fluence at D=0 corresponds to the damage threshold defined as the fluence value at which any permanent damage on the substrate can be observed.

In order to calculate the beam waist $\omega_0$ for use in determining the damage threshold fluence the following relationship may be used:

$$D^2 = 2\omega_0^2 \ln(E_p),$$

which defines the relationship between spot diameter D, the pulse energy $E_p$ and the beam waist radius of a Gaussian shaped beam at the focus $\omega_0$. By plotting the square of the crater diameter against the natural log of the pulse energy the beam waist can be determined from the slope of a straight line fit to the data (see J. M. Liu, Simple technique for measurements of pulsed Gaussian-beam spot sizes, Opt. Lett. 7 (1982) 196-198). The applied fluence can then be found using the above relationship using the calculated beam waist and the known pulse energy for each pulse in order to find the damage threshold fluence using relationship (A).

The inventors have found that by irradiating the substrate with laser pulses that are sub-nanosecond in duration, are elongate, spatially overlapped, and at a fluence lower than the corresponding single shot damage threshold for the substrate a reduce fluence processing regime is found. When the substrate is processed in this regime the inventors have found that precision structuring of substrates such as glass and ceramic materials is provided. By operating at a reduce fluence, the inventors have found that the thermal energy applied to the material is reduced, which in turn reduces the thermal stress generated in the material on cooling, while still causing an effect on the material sufficient for cutting the material (or sufficient to allow it to be cleaved along the cutting path).

The method 200 has been found to provide a number of advantages over prior art methods. Any one of more of the advantages described in this paragraph may be provided by various embodiments. Advantageously, the use of over-lapped elongate (preferably elliptical) pulses has been found to define a cut path with damage free side walls. A substrate can be partially ablated and then separated by the application of a mechanical force. The laser cut components can therefore be retained in the flexible material until singulation is required. The method of the present application has been found to produce minimal laser generated debris. The present method is flexible, and parts can be cut inside parts. The method is low power and suitable for implementation using the many high repetition rate lasers that currently exist on the market. The method of the present application is particularly useful for stress free cutting of thin flexible materials. The method is also useful for materials where stress-free fracture is an issue. The method can be configured so that there is no apparent surface lip associated with the cut parts. This enables parts to be stacked in specific applications. Finally, the method has been found to produce reduced debris in comparison with other processes.

In some embodiments, the plurality of pulses may have a fluence that is significantly less than the corresponding single shot damage threshold. The laser pulses may be controlled such that they each have a fluence less than 70% of the corresponding single shot damage threshold fluence of the substrate. In other embodiments, the fluence may be controlled to be less than 50% of the corresponding single shot damage threshold, and preferably less than 30% of the corresponding single shot damage threshold fluence of the substrate. This may allow the thermal heating effects in the material to be further reduced, and provide an improved cut edge quality.

FIG. 2 illustrates the effect of the method 100 on a substrate 200. FIG. 2 shows the cut edge of the material after being irradiated by the laser beam pulses. The laser beam has been directed onto the surface 201 of the substrate from the direction labelled L in FIG. 2. The application of the laser pulses forms a first region or cut zone 202 of the substrate which has been cut to a depth CD by the removal of material by the laser (e.g. by ablation). In the present embodiment, this region extends part way through the thickness T of the substrate (i.e. the thickness in the direction which the laser beam is directed). The application of the laser pulses may further create seeded micro-cracks in the substrate in a region 204 beginning at the boundary of the cut region 202. The fluence of the laser pulses may be controlled such that the depth which the micro-cracks extend (i.e. the depth D of region 204) is reduced. For example, the fluence of the plurality of pulses may be controlled to produce seeded micro-cracks extending a depth at most only part way through the thickness of the substrate (i.e. part way through the un-cut thickness T2) to leave a micro-crack free region 206. More preferably, the fluence may be controlled to minimise the depth at which the seeded micro-cracks terminate, and further preferably such that little or no micro-cracks are produced (i.e. depth D is substantially zero). By reducing the degree to which micro-cracks are formed the cut quality can be improved. As is discussed below, the inventors have found that the fluence can be controlled to a level at which micro-cracking is minimised or eliminated, which results in the energy of the laser pulses contributing more to ablation rather than the seeding of the micro-cracks.

In some embodiments, the micro-cracks may extend less than $\frac{1}{10}$th of the thickness T of the substrate, and preferably less than $\frac{1}{15}$th of the thickness T, and more preferably less than $\frac{1}{10}$th of the thickness T of the substrate. For example, the thickness of the substrate may be 100 microns, and the micro-cracks may extend a depth of less than 10 microns, and preferably less than 6.7 microns, and even more preferably less than 5 microns.

FIG. 3*a* illustrates the dependence of the cutting depth (CD) on the laser fluence. In FIG. 3*a* the laser fluence is expressed as the laser power, which is proportional to the laser fluence. The same relationship is shown in FIG. 3*b* with the cutting depth plotted as a function of the laser fluence. As can be seen in FIGS. 3*a* and 3*b*, the cutting depth is dependent on the fluence of the plurality of pulses of the laser beam with which the substrate is irradiated. The inventors have found that the dependence between the fluence and cutting depth has a first fluence range 302 in which the cutting depth decreases with decreasing fluence. In this range, ablation by the laser beam reduces as the fluence decreases as would be expected. A second fluence range 304 is present in which the cutting depth increases with further decreasing fluence. The second fluence range is at lower fluences to that of first fluence range as can be seen in FIG. 3. Below the second fluence range there is a third fluence range 306 in which the cutting depth again decreases with decreasing fluence. Rather than the cutting depth continuing to decease to zero at an apparent or expected threshold ablation threshold (shown by the line 308), the cutting depth is found to unexpectedly increase again despite further decrease in fluence. This increase in cutting depth continues through the second range of fluence 304, until reaching a peak at the boundary between the second and third regions, before falling again as the fluence continues to decrease. The inventors have found that an unexpected laser ablation regime is therefore provided using the method 200 when the applied laser fluence is reduced below the apparent laser ablation threshold fluence. The increase in ablation depth in the second fluence range 304 would not be expected for the ultrashort pulses used in the present method.

In some embodiments, the fluence of the plurality of pluses may be controlled so that it is at a value less than the fluence of the first dependence range 302. In other words, the fluence is controlled such that it is less than the fluence at which an increasing cutting depth occurs (the lower boundary of the first range 302) More preferably, the fluence may be controlled such that it is within the third fluence range 306. Even more preferably, the fluence may be controlled such that it is equal to just less than the fluence of the upper boundary of the third fluence range 306 i.e. in the region marked 310 in FIG. 3. This has been found to provide the best edge quality.

In the example shown in FIGS. 3*a* and 3*b*, the method 100 may involve controlling the fluence of the elongate laser pulses such that it is equal to approximately 2.5 J/cm². In this example, the laser repetition rate is 5 kHz and the pulses have an elliptical shape measuring 93 µm along the longest axis of the ellipse (L), and 33 µm along the shortest axis (W). The ellipse area can therefore be found as:

$$\text{Area} = \pi \times L \times W = 9641 \ \mu m^2$$

The pulse energy (EP) is given by laser power/repetition rate=600 nW/5 kHz=120 µJ. The fluence is therefore given as:

$$\text{Fluence} = \pi \times \frac{EP}{\text{Area}} = 2.49 \ J/cm^2$$

In this example, the corresponding single shot damage threshold for the substrate is 3.55 J/cm², which is indicated by the dashed lined marked $\varphi_{th}$ in FIG. 3*b*. As can be seen in this embodiment, the fluence is more generally controlled to be less than the single damage threshold. In the example above, the fluence is set below the damage threshold, within the region 310 to provide improved cutting. As can be seen in this example, the fluence is controlled to be approximately 70% of the corresponding single shot damage threshold fluence.

Figures 4, 5:
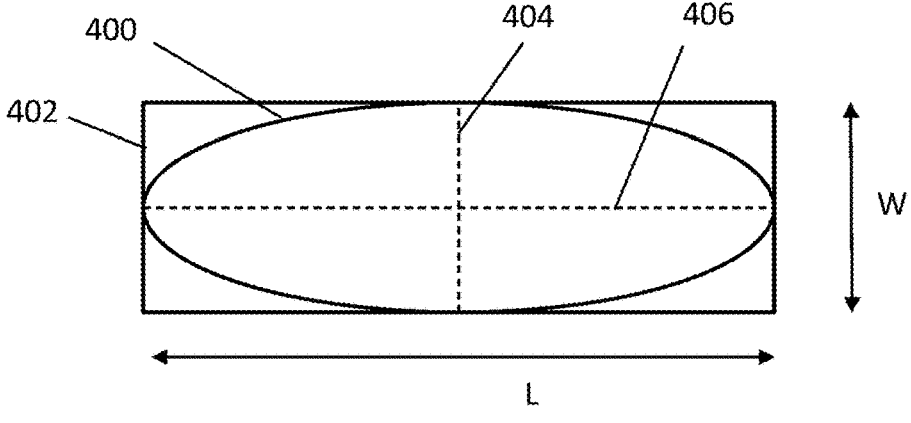
FIG. 4 shows views of the cut edge of the substrate at various laser powers indicated in FIG. 3.
FIG. 5 shows the spatial profile of the laser pulses used in the method of FIG. 1.

The result on the substrate created using laser fluences at various values in FIG. 3*a* is illustrated in FIG. 4. FIG. 4 shows images of the cut edge of the substrate resulting from the laser fluence at points marked A to G shown in FIG. 3. FIG. 4 therefore shows how the cut edge varies as the fluence is reduced. The images in FIG. 4 show a corresponding view to that of FIG. 2, and similarly show regions of the thickness of the substrate that are cut by the laser, in which micro-cracks are formed, and which are free from micro-cracks. As can be seen in image A, at higher fluences a large degree of micro-cracking is present, with micro-cracks extending throughout the uncut thickness. The depth of micro-cracks reduces in images B to D, along with the cutting depth. Between images E and F the cutting depth is seen to increase despite the reduced laser fluence. The inventors have found that this is at least partly due to energy of the laser beam contributing to ablation rather than seeding micro-cracks. Images G and H show the cutting depth continuing to decrease as the fluence is decreased further still.

Referring now to FIG. 5, an illustration of the spatial beam profile 400 of the laser beam used in the method 200 is shown. The beam profile is shown in the plane of the surface of the substrate i.e. a cross section through the beam. The beam profile is elongate in shape, and in the present embodiment is elliptical in shape. The elliptical shape may be more easily created using imaging optics (e.g. an anamorphic prism pair). Other elongate shapes may be used however, and in other embodiments the beam profile may be generally rectangular or oval.

The degree of elongation of the beam profile may be characterized by reference to the aspect ratio (length (L)/width (W)) of the smallest bounding box 402 which can fully enclose the beam profile 400. The smallest bounding box for a circular or Gaussian beam would be zero. Higher aspect ratios indicate a higher degree of elongation. In one embodiment, the smallest rectangular bounding box 402 containing the elongate cross sectional spatial profile of each of the plurality of laser pulses has as aspect ratio greater than 2. In other embodiments, it may preferably be greater than 3. Further preferably the aspect ratio may be in a range between 2 and 4. As discussed below, by increasing the aspect ratio of the beam shape the spatial overlap between pulses may be increased.

The elongate shape of each of the plurality of pulses may be characterised by a major axis 406 and a minor axis 404. The minor axis 404 is perpendicular to the major axis 406, and the length of the major axis 406 across the elongate shape is greater than the minor axis 404. Where the elongate shape is an ellipse these axes may correspond to the usual minor and major axis by which an ellipse is defined. The orientation of the elongate beam profile relative to the cutting path may be defined using the minor and major axes. The plurality of pulses may be oriented with respect to the substrate such that the major axis 406 of the elongate cross section of each pulse is aligned with the length of the cutting path in the direction of relative movement between the laser beam and substrate. As discussed above, this allows the degree of overlap to be increase.

Figure 6:
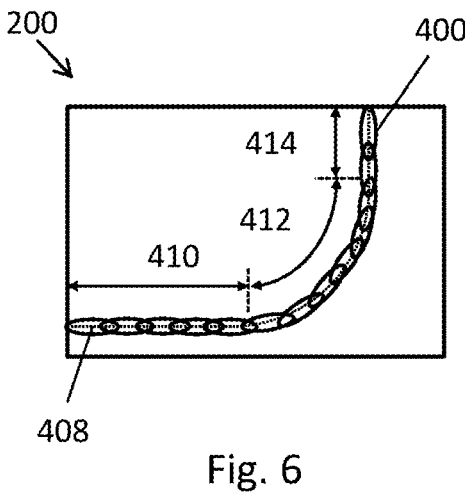
FIG. 6 shows a plan view of a substrate being irradiated with laser pulses along a cutting path having a curved portion.

In some embodiments, the orientation of the elongate profile of the laser pulses may be varied along the length of the cutting path. This may allow the major axis of the beam to remain aligned with the cutting path where the cutting path varies from a straight line. This is illustrated in FIG. 6, which shows the substrate 200 being cut along a cutting path 406 by a plurality of laser beam pulses 400 (only one of which is labelled in the figure). In this example, the cutting path 408 comprises a curved or non-straight portion 412, and two straight portions 410 and 414. Within the curved portion 412, the orientation of the plurality of pulses is varied as a function of position along the cutting path 408. The orientation is varied to maintain alignment of the major axis 406 of the elongate cross sectional spatial profile with the cutting path 408. Using this method, the inventors have found that curved paths can be cut with a radius of curvature less than 5 mm, such as 1-2 mm radius of curvature. Within the straight portions 410, 414, the orientation of the beam profile relative to the cutting path remains constant. FIG. 6 is to be understood as one illustrative example of a cutting path 408 that can be provided by the method 200, with any shape cutting path being possible by suitable relative movement between the laser beam pulses and the substrate. For example, there may be no straight portions, or no curved portion.

In some embodiments, providing 104 the relative movement between the laser beam and the substrate 200 comprises moving the laser beam along the cutting path only once in order to cut the substrate or prepare it for cleaving. The substrate 200 is therefore exposed to a single pass of the laser beam. This may provide improved edge quality of the final cut because the cutting path does not require realignment with previous passes of the laser beam over the surface of the substrate. This single pass method may be particularly suitable for thinner materials. In other embodiments, multiple passes of the laser over the cutting path may be used.

Figure 7:
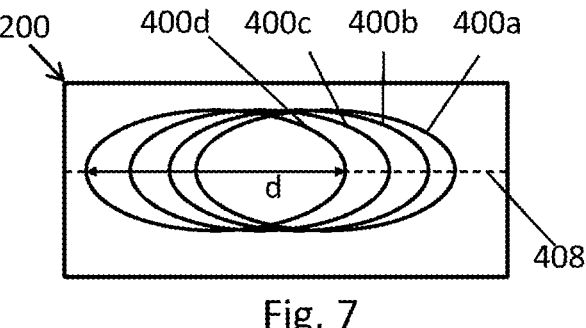
FIG. 7 shows the spatial overlap of the laser pulses used in the method of FIG. 1.

FIG. 7 illustrates the overlap of a plurality of laser beam pulses incident onto the surface of the substrate 200. FIG. 7 shows the spatial cross section of a series of elliptical pulses 400*a-d* along the cutting path 408. As can be seen in the Figure, there may be a high degree of overlap between consecutive pulses. The overlap gives a measure of how much a laser spot incident on a substrate is spatially overlapped with the previous laser spot. It can be measured in percentage degree of overlap, or shots per area (SPA). The percentage degree of overlap O may be defined using the following expression:

$$O = \frac{d - \frac{s}{Q}}{d} \times 100,$$

where d is the laser spot diameter, s is the laser mark speed (i.e. the speed at which the laser spot moves relative to the substrate), and Q is the laser repetition rate (i.e. number of laser pulses per second). The spot diameter d is the diameter of the axis of the elongate shape of the spot that is aligned with the cutting path (as shown in FIG. 7).

The number of shots per area (SPA) is given by SPA= (100/(100–percentage degree of overlap)). The inventors have recognised that when scanning with the long axis of the elongate beam shape aligned with the laser scanning direction elliptical (or other elongate) shaped laser spots provide greater potential for spatially overlapped pulses.

In some embodiments, the percentage degree of overlap O may be equal to 90%. More preferably the overlap may be greater than 95%, and preferably greater than 98%. This may allow each point along the cutting path to be exposed to a larger number of laser pulses.

The inventors have found that the use of elongate (preferably elliptical) pulses provides greater spatial overlapping of the pulses along the cutting path, e.g. when scanning with the longer (major) axis of the pulse aligned with the direction of the cutting path. This leads to an increase in the number of laser pulse being applied to the substrate per unit area, compared to using a circular laser spot. In other words, as the overlap between spots can be increased, each point on the cutting path may receive light from a greater number of pulses as the beam is scanned along the cutting path compared to if the laser pulses were circular.

The inventors have found that the use of elongate pulses (preferably elliptical) may result in increased stress cycling with each laser pulse in the substrate along the cut path in the absorption zone for the laser in that material. This in turns provides incremental crack growth with each stress cycle caused by each laser pulse. Greater cycles may lead to fracture due to fatigue mechanisms. This has been found to result in granular/intergranular failure in ceramic substrates, and micro-cracks in glass substrates. As a result, photomechanical fragmentation in the laser cut zone is produced. Subsequent application of a mechanical stress can then lead to full fracture and separation of the substrate along the cutting path as is described later.

The higher degree of overlap possible using elongate beam shapes has been found by the inventors to lead to more stress cycling and less thermal stress on a macroscale. In combination with a lower fluence this leads to less microcracking at a lower edge of the cut zone. This effect at least partly allows the method of the present application to provide a smoother edge on fracture.

As discussed above, the method 100 may comprise cutting the substrate or preparing it for cleaving. The step of irradiating the substrate with multiple pulses can lead to a pre-determined depth of cut (e.g. cutting depth CD shown in FIG. 2). In some embodiments, the thickness of the substrate can be fully cut by the laser. In other words the full thickness T of the substrate is cut by the laser pulses. In this embodiment, no separate cleaving step is required. In other embodiments, the substrate may be partially cut by the laser pulses (e.g. the cutting depth is less than the total thickness of the substrate). In such embodiments, a force can be applied to the substrate so that the cut is completed to separate the parts of the substrate defined by the cutting path. In some embodiments, the stress required to separate the substrate into parts is applied by the laser pulses. It is thought that the less from application of the laser results from vapour recoil pressure/ thermal stress induced during laser ablation. Using this method the substrate may be fully cut using the laser, despite the cutting depth only being part way through the thickness of the material.

Figure 8:
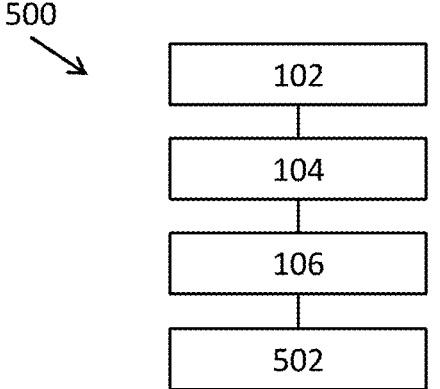
FIG. 8 shows a method of cutting a substrate which includes the method of FIG. 1.

In some embodiments, the method 100 described above may be incorporated into a method 500 of cutting a substrate in which a separate cleaving step is provided. An example of such a method is illustrated in FIG. 8, which comprises the steps 102, 104, and 106 of FIG. 1, by which the substrate is partially cut by the application of the laser pulses along the cutting path (e.g. part way through the thickness of the substrate). The method 500 further comprises applying 502 stress to the substrate to cleave the substrate along the cutting path. The stress may be applied as part of a separate process e.g. the substrate may be processed using the laser, and then separated along the cutting path at a later time and place using different equipment. The substrate may therefore in some embodiments be supplied after being processed using the laser so that the cut can be completed by a third party.

In one embodiment, a tensile stress is applied using equal and opposite forces applied within the plane of the substrate 200, for example perpendicularly to one or more cutting paths 408 defined by the laser pulses. Alternatively or additionally, shear stresses may be applied. Equal and opposite forces can be applied perpendicularly to the plane of the substrate 200 and on opposite sides of a cutting path 408. Alternatively or additionally, equal and opposite forces can be applied within the plane of the substrate 200 but on opposite sides of the cutting path 408.

In a range of embodiments the stress may be applied mechanically. The stress may be applied by bending the substrate 200, for example about an axis lying within the plane of the substrate 200, for example an axis parallel to the cutting path 408.

In some embodiments, a stress applicator is configured to apply a stress to the substrate 200 by driving a rigid member against a localised region of the substrate 200. A constraining arrangement may be arranged to constrain the substrate 200 such that the pressure provided by the rigid member causes tensile stresses to drive crack propagation along a cutting path 408 along which the substrate has been partially cut by the laser.

In one embodiment, the stress is applied by generating a mechanical resonance in the substrate. The mechanical resonance may be generated by applying a periodic force to the substrate 200. The periodic force may comprise a frequency which is the same as or close to a natural resonance frequency of the substrate 200. In one embodiment, the mechanical resonance is generated using periodically switching air jets. This approach may be advantageous because it is not necessary to bring any additional apparatus into direct contact with the substrate 200. Alternatively or additionally, the mechanical resonance may be generated by applying acoustic waves to the substrate. Alternatively or additionally, the mechanical resonance may be generated by actuating one or more electrically actuatable elements in contact with the substrate, each electrically actuatable element applying a periodic force to the substrate on actuation. The electrically actuatable elements may comprise piezoelectric devices for example.

In an embodiment the stress is applied by the laser ablation. It is thought the stress from laser ablation arises due to vapour recoil pressure/thermal stress.

In other embodiments the stress is applied thermally. For example, in an embodiment, the substrate 200 is mounted on or attached to an element (e.g. a PET or metal layer). A heater may provide heating to the element. Thermal expansion of the element causes a tensile stress to be applied to the substrate 200. The tensile stress may cause crack propagation along the cutting path 408.

In another embodiment, the stress is applied thermally using a laser. In an embodiment of this type at least one laser spot is applied on each side of a cutting path. The laser spots are scanned parallel to the cutting path 408. The laser spots heat the substrate 200 locally which causes expansion of the substrate 200. The substrate 200 then cools in the wakes of the laser spots, leading to contraction of the substrate 200. In this embodiment, the heating laser may be separate from the laser used to partially cut the substrate.

In another embodiment, the stress is applied by causing a phase change within the substrate. For example, some substrates (such as a shape memory alloy) can be deformed by cooling below the phase transition temperature. If a tensile stress is applied to the cooled material, it will be deformed by expansion. In one embodiment, a substrate may be processed by irradiation of the laser pulses using the methods described herein at a temperature below the phase transition of the substrate. The method may then further comprise clamping the substrate using a suitable fixture so that its deformation (e.g. expansion or contraction) is constrained. The method may then comprise heating the substrate above the phase transition temperature. The substrate will then be constrained from deforming by contraction to its high temperature structure. A tensile stress will result in the material, which can be configured to cleave the material along the cutting path already scribed by the laser.

In another aspect, the present application provides an apparatus, e.g. a laser processing apparatus, suitable for use in cutting a substrate or preparing the substrate for cleaving. The apparatus may be configured to perform the method 200 described above, or any other method embodiment disclosed or claimed herein.

Figure 9:
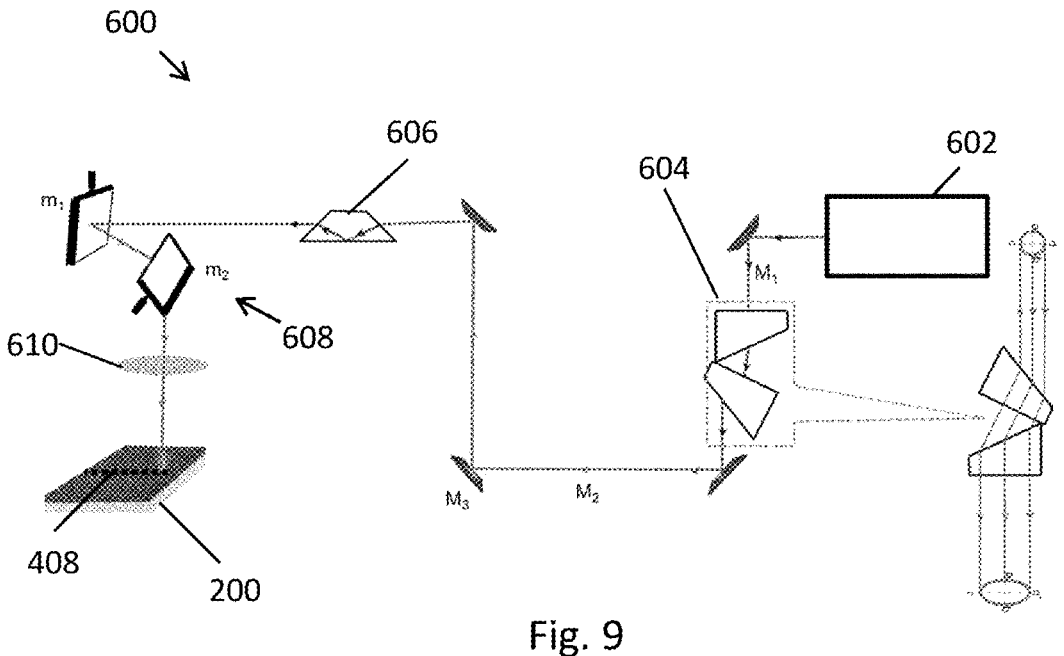
FIG. 9 shows a schematic view of an apparatus according to an embodiment.

One embodiment of an apparatus 600 is illustrated in FIG. 9. The apparatus 600 comprises a laser system that generally comprises a laser source 602, a beam shaping device 604, a beam rotation device 606 and a beam projection device 608. The laser system is configured to irradiate the substrate 200 with a plurality of laser pulses along the cutting path 408 as illustrated in FIG. 9. Laser radiation from the laser source 602 is directed through the beam shaping device, beam rotation device and beam projection device as shown in FIG. 9 so that it is projected onto the substrate surface. One or more mirrors or other optical elements may be provided to direct the laser radiation through the laser system. FIG. 9 should be understood as a schematic illustration only, with other arrangements and optical layouts being possible.

The laser source may be a laser arranged to provide the plurality of laser pulses. For example, the laser source may comprise an ultra-short pulsed laser, such as a titanium-sapphire laser, or other ultrafast laser with amplifiers. In other embodiments, other suitable types of laser may be used according to the level of laser fluence required for the processing of a specific substrate material.

The beam shaping device 604 is arranged to shape the beam into an elongate shape. In the presently described embodiment, the beam shaping device comprises a pair of anamorphic prims arranged to create an elliptical beam profile from a circular beam provided by the laser. In other embodiments, other types of beam shaping devices may be used, which may include beam shaping optics configured to provide the desired elongate beam profile. For example, a rectangular beam profile may be provided by suitable optics known in the art.

The laser system further comprises a beam rotation device 606 arranged to rotate the laser beam pulses. This may allow the longest axis of the elongate beam profile to be aligned with the cutting path 408. In some embodiments, the beam rotation device 606 may be arranged to vary the rotation of the beam such that the longest axis alignment can be varied along the length of the cutting path above so that non-straight paths can be cut. In the presently described embodiment, the beam rotation device comprises a dove prism. The dove prism may be mounted to a suitable programmable stage so that the elongate beam can be rotated according to the scan direction of the laser. Where a dove prism is used, it may be arranged to both rotate the beam and produce the elongate beam profile. Separate beam shaping optics may not therefore be required in some embodiments. The beam shaping device may therefore be arranged to also rotate the beam. In other embodiments, other beam rotation devices may be used.

The beam projection device 608 is arranged to project or direct the laser pulses onto the surface of the substrate such that the substrate is irradiated as described above. The projection device 608 may be arranged to provide relative movement of the laser beam with respect to the substrate by moving the laser beam relative to a fixed substrate. In this embodiment, the beam projection device 608 comprises a Galvanomter system. Other types of beam projection device may however be used to direct the laser beam relative to the substrate.

In other embodiments, the beam projection device 608 may project a fixed or stationary laser beam onto the surface of the substrate 200. The relative movement in such an embodiment may be provided by movement of the substrate 200. In some embodiments, the processing apparatus 600 may comprise a movable mount for the substrate 200. The moveable mount may comprise a CNC stage or the like arranged to provide controlled movement of the substrate 200 relative to the laser beam. In yet other embodiments, the beam projection device 608 may be arranged to provide movement of the beam in combination with a movable mount for the substrate.

The laser system further comprises a lens 610 arranged to focus the laser beam onto the surface of the substrate. This may provide the desired spot size. In other embodiments, other focusing or beam shaping optics may be provided as required.

The processing system 600 may further comprise a controller (not shown in the figures) arranged to control the various components of the system shown in FIG. 9 (and a movable mount for the substrate if provided). The controller may be a computer device configured to control the apparatus 600 to cut or prepare the substrate for cutting along a desired cutting path.

In some embodiments, the apparatus 600 may form part of a laser cutting system arranged to cut the substrate along the cutting path. In one embodiment, the laser system is arranged to completely cut the thickness of the substrate along the cutting path as described above. In other embodiments, the laser system may be arranged to only partially laser cut the thickness of the substrate using the laser pulses. In such an embodiment, the laser cutting apparatus is further arranged to apply a stress to the substrate to cleave the substrate along the cutting path. In some embodiments, the stress may be applied by the cutting laser 602 as described above. In yet other embodiments, the laser cutting apparatus may comprise additional components to apply stress, such as an additional laser, or a mechanical device to apply stress as described above.

Example Implementation and Results

In one exemplary non-limiting practical implementation of the above embodiments, ultrashort laser pulses were created using an amplified desktop ultrashort pulse laser system and directed onto the surface of a borosilicate glass substrate having a thickness of 100 μm. The pulse duration was 500 fs, the laser wavelength was 1034 nm and the repetition rate of the laser was 5 kHz. The laser pulse had an elliptical cross section with a diameter of 93 μm ($1/e^2$ diameter) along the longest of its axes. A 3:1 ratio between the major and minor axis was used. The spatial overlap of the laser spots was 92-95%. The laser pulse energy in this example was measured using a power meter. The laser fluence in this example was controlled to be 2.49 $Jcm^{-2}$. The single shot damage threshold for the substrate in this example is 3.55 $Jcm^{-2}$. This was measured using the method defined above. The parameters in this paragraph are to be understood as exemplary only, and can be modified as appropriate in order to implement the method with other substrates.

Figure 10:
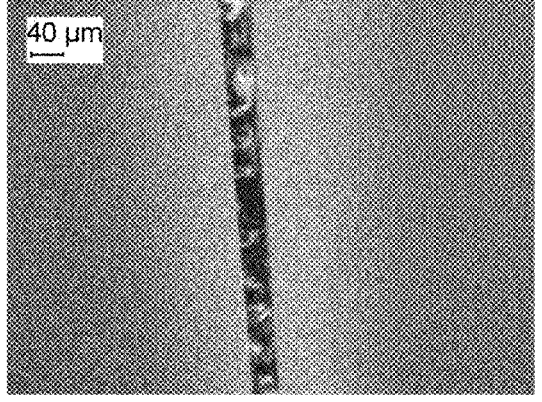
FIGS. 10 and 11 show a comparison of standard cut edge of a substrate and a substrate cut using the method of the present application respectively.
Figure 11:
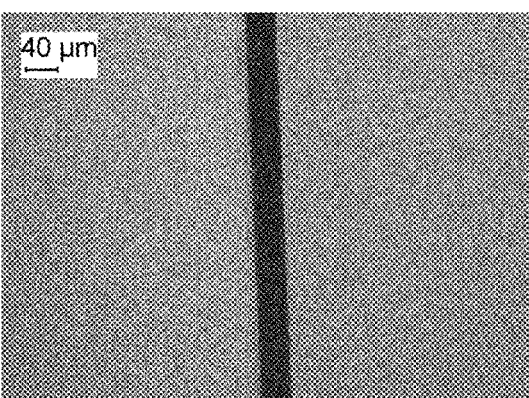
Figure 12:
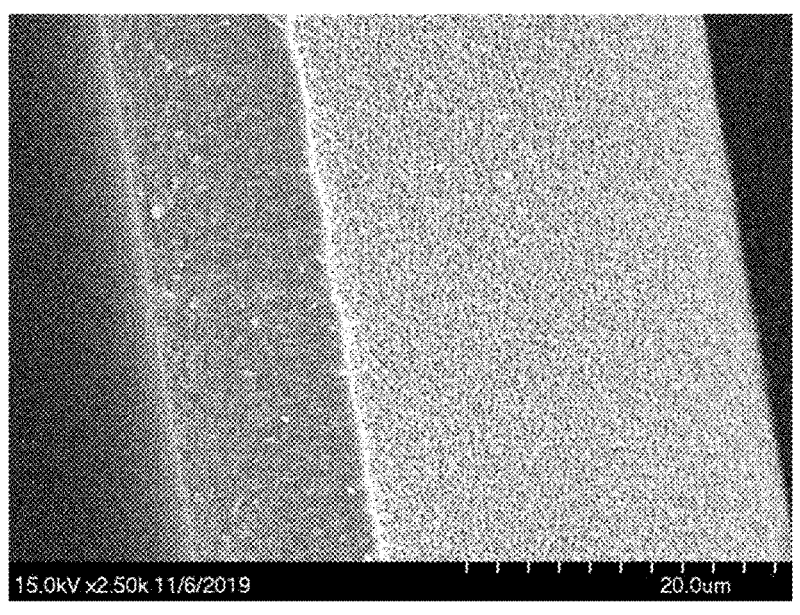
FIG. 12 shows a close up view of a substrate cut using the method of the present application.
Figure 13:
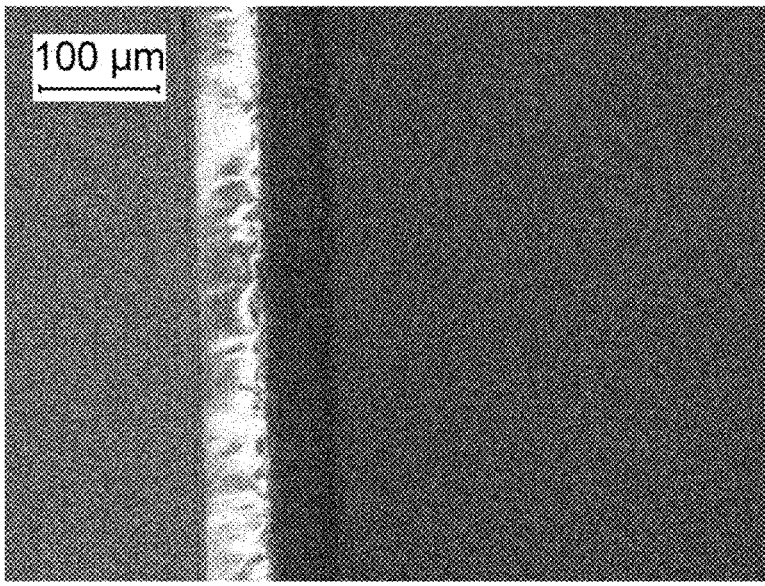
FIG. 13 shows another view of the cut edge of a substrate cut using the method of the present application.

FIGS. 10 and 11 show a comparison of the results of the cut edge of the substrate cut using the above example. FIG. 10 shows a standard cut edge on the substrate as supplied from the manufacturer. FIG. 11 shows the results of cutting using the method of the present application. FIG. 12 shows a SEM close up image of the cut edge of the substrate cut using the method of the present application to cut a ceramic substrate. FIG. 13 shows an image of the cut edge of a glass substrate. As can be seen in these figures, a high quality cut edge is provided, with minimal rear surface damage.

Various modifications will be apparent to the skilled person without departing form the scope of the claims. The embodiments described above should be understood as exemplary only. Any feature of any of the aspects or embodiments of the disclosure may be employed separately or in combination with any other feature of the same or different aspect or embodiment of the disclosure and the disclosure includes any feature or combination of features disclosed herein.

The invention claimed is:

1. A method for use in cutting a substrate or preparing a substrate for cleaving, comprising:

irradiating the substrate with a plurality of pulses of a laser beam, the pulses having a pulse duration of less than a nanosecond and an elongate cross sectional spatial profile, and wherein the fluence of the plurality of pulses is controlled to be less than a single shot damage threshold fluence of the substrate;

providing relative movement between the laser beam and the substrate such that the plurality of pulses are arranged along a cutting path; and controlling the relative movement such that each of the pulses is spatially overlapped with at least one other of the pulses along the cutting path.

2. The method of claim 1, wherein the plurality of pulses each have a fluence less than 70% of the single shot damage threshold fluence of the substrate.

3. The method of claim 1, wherein the plurality of pulses each have a fluence less than 50% of the single shot damage threshold fluence of the substrate.

4. The method of claim 1, wherein the fluence of the plurality of pulses is controlled to produce seeded micro-cracks extending a depth at most only part way through a thickness of the substrate.

5. The method of claim 4, wherein the fluence is controlled to minimize the depth at which the seeded microcracks terminate.

6. The method of claim 1, wherein:

a cutting depth caused by the laser irradiance is dependent on the fluence of the plurality of pulses of the laser beam;

the dependence between the fluence and cutting depth has a first fluence range in which the cutting depth decreases with decreasing fluence and a second fluence range in which the cutting depth increases with decreasing fluence, the second fluence range being at lower fluences to that of first fluence range; and the fluence of the plurality of pulses is controlled to be within or less than the second fluence range.

7. The method of claim 4, wherein:

the dependence between the fluence and cutting depth has a third fluence range in which the cutting depth decreases with decreasing fluence, the third fluence range being at lower fluences to that of the second fluence range; and the fluence of the plurality of pulses is controlled to be within the third fluence range.

8. The method of claim 1, wherein the elongate shape of each of the plurality of pulses has a major and a perpendicular minor axis, the length of the major axis across the elongate shape being greater than the minor axis, and wherein the plurality of pulses are oriented with respect to the substrate such that the major axis of the elongate cross section of each pulse is aligned with the length of the cutting path in the direction of relative movement between the laser beam and substrate.

9. The method of claim 8, wherein:

the cutting path comprises a curved portion; and the orientation of the plurality of pulses is varied as a function of position along the cutting path within the curved portion.

10. The method of claim 9, wherein the major axis of the elongate cross sectional spatial profile is maintained in alignment with the cutting path.

11. The method of claim 1, wherein the smallest rectangular bounding box containing the elongate cross sectional spatial profile of each of the plurality of laser pulses has as aspect ratio greater than 2.

12. The method of claim 1, wherein the smallest rectangular bounding box containing the elongate cross sectional spatial profile of each of the plurality of laser pulses has as aspect ratio in a range between 2 and 4.

13. The method of claim 1, wherein providing the relative movement between the laser beam and the substrate comprises moving the laser beam along the cutting path only once in order to cut the substrate or prepare it for cleaving.

14. The method of claim 1, further comprising cutting the substrate.

15. The method of claim 14, wherein the substrate is partially cut by irradiation by the laser ablation along the cutting path, and the method of cutting further comprises applying stress to the substrate to cleave the substrate along the cutting path.

16. The method of claim 15, wherein any one or more of:

the stress is applied by the laser irradiation;

the stress is applied mechanically;

the stress is applied by bending the substrate;

the stress is applied by driving a rigid member against a localized region of the substrate;

the stress is applied by generating a mechanical resonance in the substrate; the stress is applied thermally; and the stress is applied by causing a phase change within the substrate.

17. The method of claim 14, wherein the substrate is completely cut by the laser irradiation.

18. An apparatus for cutting a substrate or preparing a substrate for cleaving, the apparatus comprising:

a laser system configured to:

irradiate the substrate with a plurality of pulses of a laser beam, the pulses having a pulse duration of less than a nanosecond and an elongate cross sectional spatial profile;

control the fluence of the plurality of pulses to be less than a single shot damage threshold fluence of the substrate;

provide relative movement between the laser beam and the substrate such that the plurality of pulses are arranged along a cutting path; and control the relative movement such that each of the pluses is spatially overlapped with at least one other of the pulses along the cutting path.

19. The apparatus of claim 18, wherein the laser system comprises a beam rotation device arranged to rotate the laser beam pulses, the beam rotation device comprising a dove prism.

20. The apparatus of claim 18, wherein:

the laser system is configured to;

partially cut the thickness of the substrate and apply a stress to the substrate to cleave the substrate along the cutting path; or completely cut the thickness of the substrate along the cutting path.

* * * * *